T. W. FITZGERALD.
REGISTER FOR MEASURING MACHINES OR DEVICES.
APPLICATION FILED AUG. 6, 1909.
1,009,295.
Patented Nov. 21, 1911.
2 SHEETS—SHEET 1.
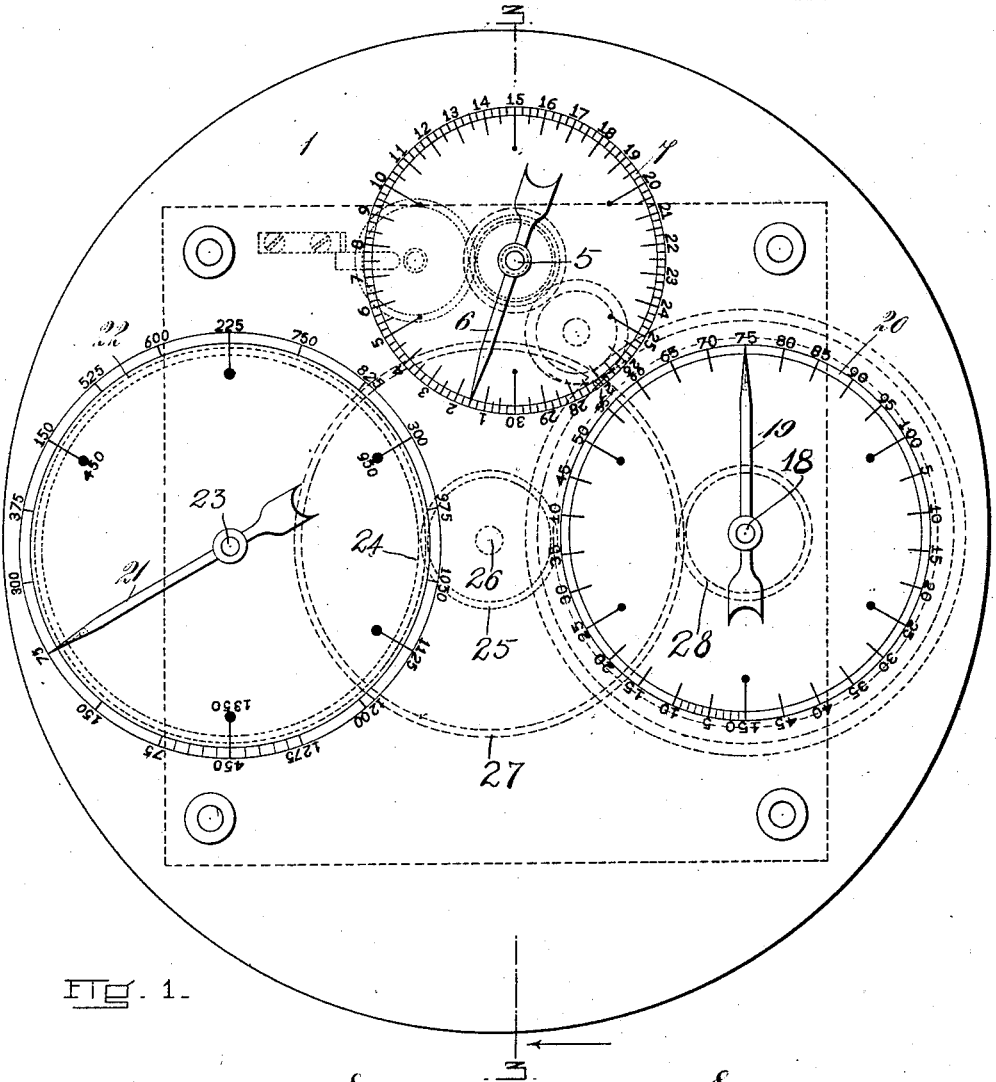

T. W. FITZGERALD.
REGISTER FOR MEASURING MACHINES OR DEVICES.
APPLICATION FILED AUG. 6, 1909.
1,009,295.
Patented Nov. 21, 1911.
2 SHEETS—SHEET 2.
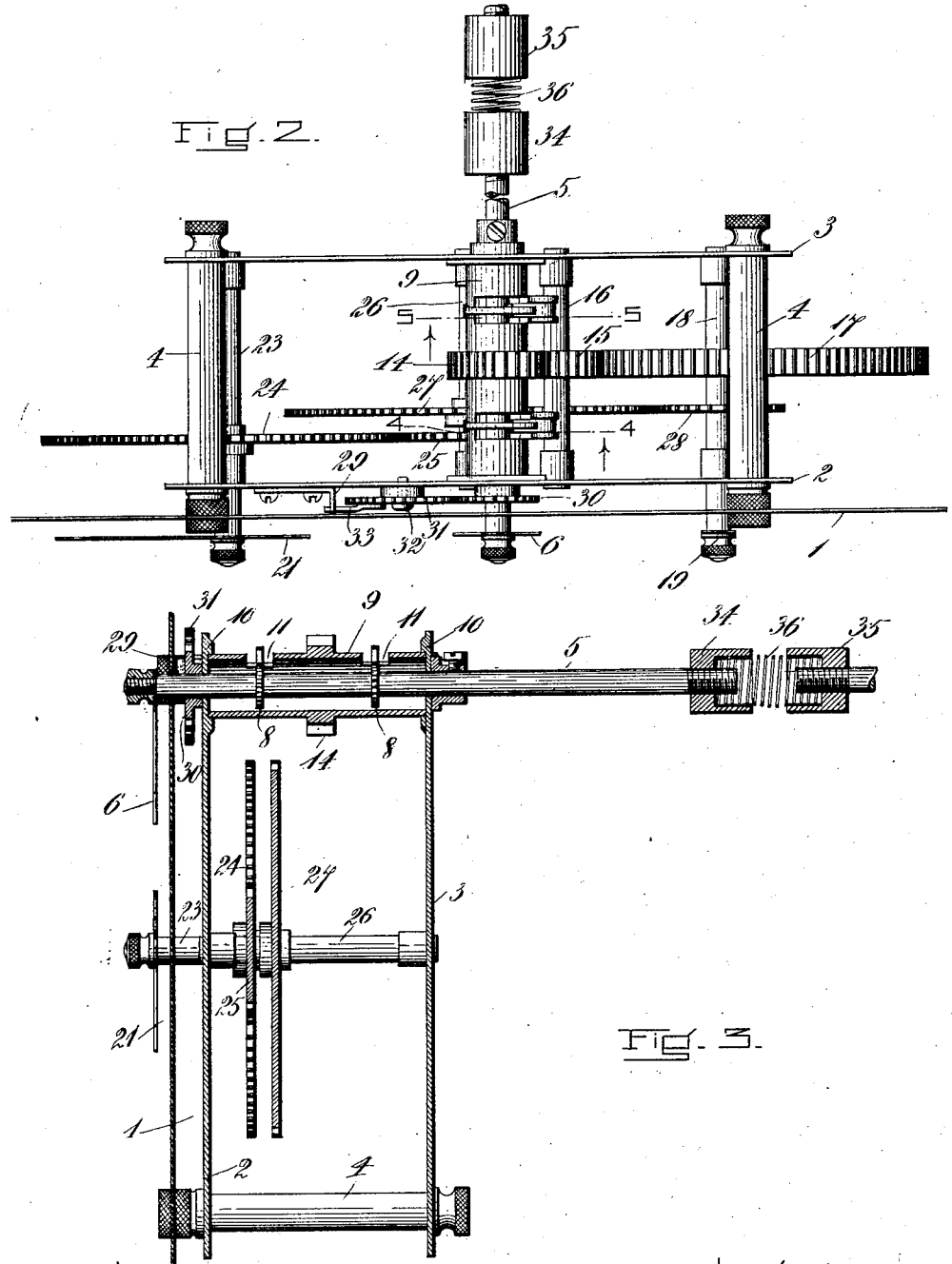

UNITED STATES PATENT OFFICE.

THOMAS W. FITZGERALD, OF BOSTON, MASSACHUSETTS.

REGISTER FOR MEASURING MACHINES OR DEVICES.

1,009,295. Specification of Letters Patent. Patented Nov. 21, 1911.

Application filed August 6, 1909. Serial No. 511,530.

*To all whom it may concern:*

Be it known that I, THOMAS W. FITZGERALD, of Boston, in the county of Suffolk and State of Massachusetts, a citizen of the United States, have invented a new and useful Improvement in Registers for Measuring Machines or Devices, of which the following is a full, clear, and exact description, reference being had to the accompanying drawings, forming a part of this specification, in explaining its nature.

My invention relates to a register especially applicable to a machine for measuring lengths of materials.

The attachment comprising my invention is one on which may be indicated the length of any individual object measured or the indication of the resultant lengths of separate objects successively measured.

The construction embodying my invention can best be seen and its operation better understood by reference to the drawings in which—

Figure 1 shows the register in front elevation. Fig. 2 is a plan. Fig. 3 is a section taken on the line 3—3 of Fig. 1. Fig. 4 is a section taken on the line 4—4 of Fig. 2, and Fig. 5 is a section taken on the line 5—5 of Fig. 2.

Referring to the drawings:—1 represents a face plate or dial. Supporting this dial on the rear side thereof is a frame comprising plates or sides 2 and 3, respectively, spaced apart and held by posts 4 which also act by their projecting ends to carry the dial, the dial being fastened to the ends of the posts in any suitable manner.

Extending transversely through the plates of the frame to turn therein and projecting also through the dial is a spindle or shaft 5 having a primary indicating hand 6 arranged on the projecting end thereof and which hand 6 extends over the face of the dial to properly coöperate with a scale 7 formed thereon. The shaft or spindle 5 it will be understood is the instrument adapted to be rotated by the main measuring machine or device (not shown) to which the attachment comprising my invention is applied, the amount or extent of rotation of the spindle being commensurate with the length of the object measured. As the spindle is rotated the hand 6 will accordingly turn with it when the extent of movement of the spindle and hand may be read upon the scale with which the hand is coöperating in units or terms designating the length of the object measured. The hand 6 is properly merely a temporary indicating hand for after the measurement of an object has been taken then in preparation for the measurement of a new object the indicating hand is thrown back by reversing the spindle in order that a fresh measurement may be taken with the indicating hand at the initial point on the scale. The reversal of the spindle and return of the indicating hand as aforesaid is accomplished in the operation of the main machine as is well known to those skilled in the art.

For the purpose of obtaining a permanent indication of the measurements taken I have provided the following described mechanism: Arranged upon the spindle 5 in that portion thereof located between the sides of the frame is a ratchet wheel 8. I prefer to employ two of these ratchet wheels on the spindle. Outside that portion of the spindle located between the two sides of the frame and concentric with the spindle is a sleeve 9. This sleeve is removed from the spindle in order that there may be no frictional engagement between these parts, the sleeve being journaled to turn in bearings 10 fixed to the sides of the frame. At the point or points of the ratchet wheels 8 in the spindle openings 11 are formed in the sleeve by which access may be had to said wheels. At points just adjacent to these openings in the sleeve lugs are formed thereon in which are pivoted dogs 12 which extend through the openings in the sleeve and engage the respective ratchet wheels. The dogs are held in normal engagement with the ratchet wheels by means of springs 13 attached to the sleeve and bearing against the dogs.

The arrangement and disposition of the parts just described is such that the sleeve will be rotatably driven or turned with the spindle by an engagement between the dogs and ratchet wheels only when the spindle is turning progressively or when a measurement is being taken. No movement will be imparted to the sleeve, however, upon a reverse turning of the spindle there being as said before no frictional engagement between the spindle and sleeve, the dogs simply slipping over the ratchet wheels with the sleeve remaining passive.

Attached to the sleeve 9 is a pinion or gear 14. Meshing with this gear for receiving power imparted thereto is a gear 15 fixedly mounted upon a shaft 16 interposed between and journaled to turn within the two sides of the frame. The gear 15 meshes with a gear 17 fixedly arranged upon a shaft 18 which like the shaft 16 is also interposed between and journaled to turn within the two sides of the frame. The shaft 18 is extended from the frame to project through the dial 1 and carries upon its projecting end a secondary indicating hand 19. This hand extends across the face of the dial to properly coöperate with a scale 20 formed thereon. Thus connecting with the spindle the hand 19 will be moved progressively over the scale 20 as the spindle is turned during the taking of any measurement, the hand indicating on the scale the total units or record of successive measurements. Arrangement is also made by the proper size and adaptation of the gears forming a part of the chain of connection between the hand 19 and the spindle whereby the hand 19, as the spindle is progressively turned, will in its relation to the scale move much more slowly than does the hand 6 in relation to the scale 7. In other words, for one complete revolution of the hand 6 around the scale 7 the hand 19 will have transcribed only a partial revolution around the scale 20, the respective scales of course being so graduated that for any defined movement of the spindle, though the respective hands may move comparatively different distances, yet the movement indicated on the respective scales is precisely the same. I prefer that the hand 19 be a slowly moving hand for the reason that the longer measurement or the resultant of successive measurements may be indicated for one complete revolution of the hand. In this connection attention is directed to a further secondary or tertiary indicating hand 21 extending over the face of the dial and coöperating with a scale 22 formed thereon. The hand 21 is arranged on the end of a shaft 23 journaled to turn within the frame and projecting through the dial. On this shaft is arranged a gear 24 meshing with a gear 25 on the shaft 26 interposed between and journaled to turn within the two sides of the frame. On the shaft 26 is arranged a gear 27 meshing with a gear 28 on the shaft 18 carrying the indicating hand 19. The respective gears 24, 25, 27, 28 are so related in size that the hand 21, as the spindle is turned progressively during the taking of a measurement, will be moved over the scale 21 even more slowly than the movement of the hand 19 in its relation to the scale 20 with the effect that the hand 21 during a single revolution around the scale 22 will indicate thereon the resultant of a large number of successive measurements aggregating a considerable length. Moreover the readings on the scale 22, especially fractional readings, may accurately be made by reference to the hand 19 in relation to the scale 20.

Reference has already been made to the fact that after taking the measurement of a single object the hand 6 is turned back to the zero point by a reverse turning of the spindle which is accomplished in the operation of the main machine to which the attachment is secured. During this reverse movement of the hand no movement will be imparted to the hands 19 and 21 inasmuch as these hands are actuated only as the spindle is moved progressively. If, however, during the reverse movement of the spindle the indicating hand 6 were moved back of the zero point on the scale 7 then in order to start a fresh measurement with the hand 6 at the zero point as successive measurements are taken, it would be necessary to move the hand forward to the zero point though no actual measurement would be taken at the time. The consequent effect would be that the hands 19 and 21, by such progressive movement of the hand and spindle would also be moved progressively and increase the resultant indications when no measurement was in fact being taken. Provision is made for this, however, by providing a stop 29 acting to prevent a further reverse movement of the spindle when the indicating hand carried by it has been turned back to the zero point on the scale. This stop is effected in the following manner: Attached to the spindle preferably at a point between the frame and the dial is a gear 30 Fig. 2. Meshing with this gear is a gear 31 arranged to turn on a stud 32 affixed to the frame. The gear 31 has secured to it a projecting arm 33 which, as the spindle and connecting gears 30 and 31 are turned, is adapted to engage the stop 29 affixed to the frame. The arrangement of the arm 33 on the gear 31 in its relation to the stop is such that upon a reverse movement of the spindle such reverse movement will be stopped when the indicating hand carried by the spindle has been restored to the zero point. Moreover I prefer by a graduation in the size of the connecting gears 30 and 31 in their relation to one another and to the stop that the spindle and hand 6 carried by it may be turned progressively during the period of more than one complete revolution of the hand 6 with respect to its scale in order that objects of considerable length may be measured without the necessity of reversing the spindle in order to accomplish the complete measurement of such object. Otherwise if the length of the object were such that it could not be indicated by one complete revolution of the hand 6 it would be necessary to reverse the spindle before the complete measurement of the object could be attained. In order to overcome any undue strain upon the spindle and operating parts as the spindle is reversed to engage the stop as aforesaid, I have placed in the spindle what may be termed a yielding section. This comprises opposing hubs 34, 35 fixed in the spindle and holding between them a coil spring 36.

The advantage of the yielding section or spring in the spindle is as follows: The spindle is turned back to engage the stop and the hand carried by it set at the zero point by the reversal of the measuring machine. Now the measuring machine is generally reversed with a quick return throw or movement acting to abruptly stop it with the effect that as the machine is thus abruptly stopped there is more or less back lash of its parts which connect with the spindle, these parts, however, after the back lash immediately settling forward to a normal starting position. Inasmuch as the spindle cannot turn back beyond the point of the stop and the hand carried by it back of the zero point, the back lash of the measuring machine would normally not only throw a severe strain upon the spindle but as the measuring machine settled back or returned to its normal starting point the tendency would be to turn the spindle forward when the indicating hand would accordingly indicate a false measurement. The yielding section in the spindle however permits of the back lash of the measuring machine upon its reversal, the spring taking up the strain and becoming torsioned by such back lash and as the measuring machine settles back to its normal position or starting point all torsion will be taken out of the spring and all strain removed from the spindle so that when the measuring machine starts it will act to turn the spindle from the point of the stop and the indicating hand from the zero point.

Having thus fully described my invention, I claim and desire to secure by Letters Patent of the United States:—

1. In a register of the character specified, the combination with a frame, of a spindle having bearing to turn in said frame, a shaft also having bearing to turn in said frame, an indicating hand carried by said shaft, a sleeve adapted to turn in said frame, said sleeve being concentric with said spindle and removed therefrom, means whereby said sleeve may turn with said spindle as said spindle is moved in one direction or said spindle turn independently of said sleeve without turning the same as said spindle is moved in a reverse direction, and a geared connection between said sleeve and shaft.

2. In a register of the character specified, the combination with a frame, of a spindle having bearing to turn in said frame, said spindle having a toothed wheel thereon, a shaft also having bearing to turn in said frame, an indicating hand carried by said shaft, a sleeve adapted to turn in said frame, said sleeve being concentric with said spindle and removed therefrom, said sleeve having also an opening therein, a spring-pressed pawl carried by said sleeve and engaging said wheel through the opening in said sleeve, and a geared connection between said sleeve and shaft.

3. In a register of the character specified, the combination with a frame, of a spindle having bearing to turn in said frame, said spindle having disconnected parts and a yielding connection between said parts, a stop defining the primary turned position of said spindle, means whereby the spindle may coöperate with said stop, a shaft having bearing to turn in said frame, an indicating hand carried by said shaft, a sleeve adapted to turn in said frame, said sleeve being concentric with said spindle and removed therefrom, means whereby said sleeve may turn with said spindle as said spindle is turned in one direction or said spindle turn independently of said sleeve without turning the same as said spindle is turned in a reverse direction, and a geared connection between said sleeve and shaft.

4. In a register of the character specified, the combination with a frame, of a rotary spindle having disconnected parts and a yielding section joining said parts, the same comprising hubs connecting respectively with the disconnected parts of said spindle, and a spring interposed between and connecting said hubs, a stop, and means connecting with said spindle and engaging said stop which means is adapted and arranged to the end that said spindle may be turned progressively through only a defined range of rotative movement or upon a reverse turning of said spindle it may stop at a determinate point.

THOMAS W. FITZGERALD.

Witnesses:
  JOHN E. R. HAYES,
  M. D. NEWMAN.